No. 791,321. PATENTED MAY 30, 1905.
C. R. CHAPMAN & W. S. KENNELL.
AUTOMATIC CHUCK.
APPLICATION FILED JULY 5, 1904.
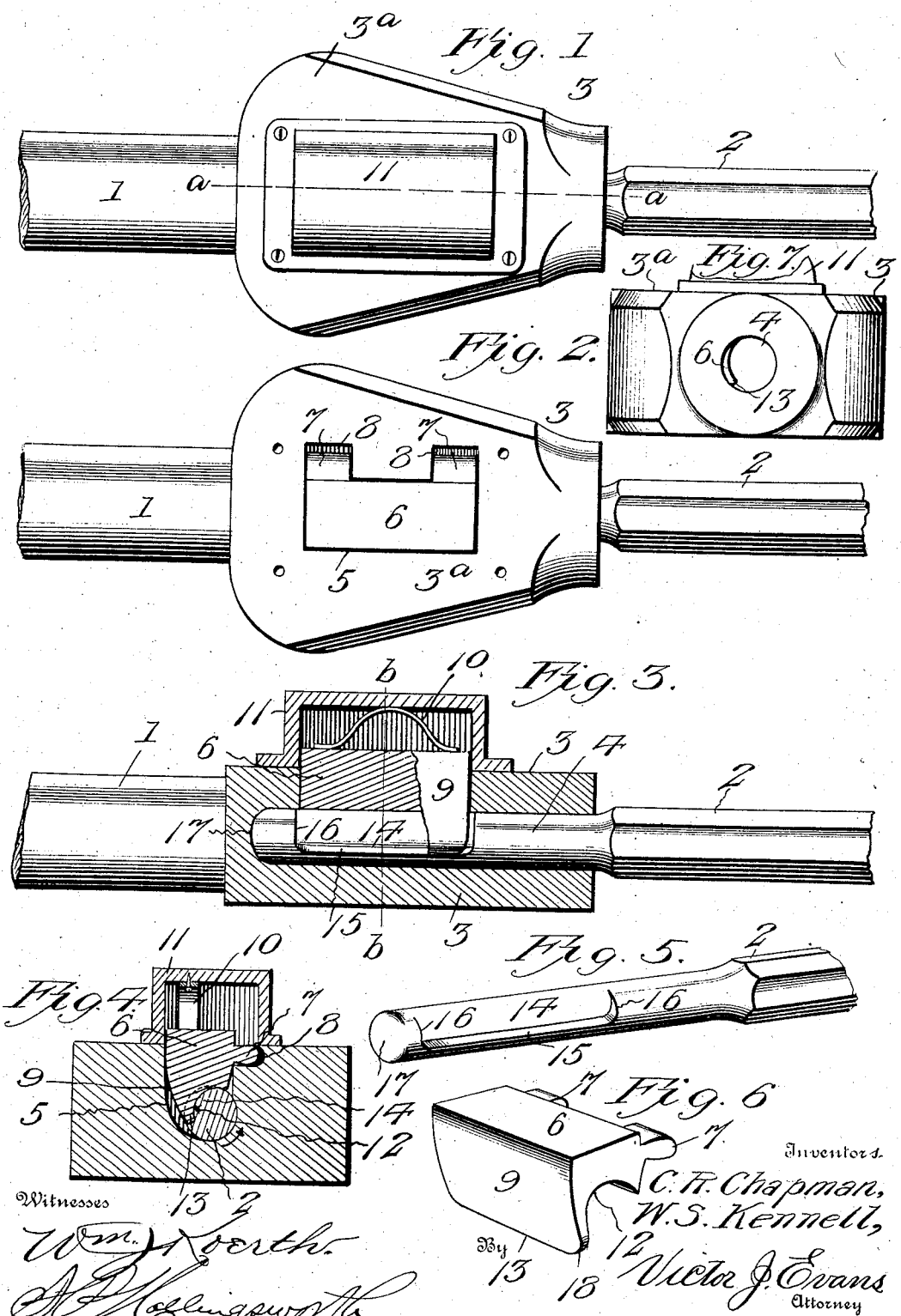

No. 791,321. Patented May 30, 1905.

UNITED STATES PATENT OFFICE.

CHRISTOPHER R. CHAPMAN AND WILLIAM S. KENNELL, OF AMETHYST, COLORADO.

AUTOMATIC CHUCK.

SPECIFICATION forming part of Letters Patent No. 791,321, dated May 30, 1905.

Application filed July 5, 1904. Serial No. 215,444.

*To all whom it may concern:*

Be it known that we, CHRISTOPHER R. CHAPMAN and WILLIAM S. KENNELL, citizens of the United States, residing at Amethyst, in the county of Mineral and State of Colorado, have invented new and useful Improvements in Automatic Chucks, of which the following is a specification.

This invention relates to a tool-holder or chuck for holding drills and similar tools which are to be either rotated or moved in a longitudinal direction.

The object of the invention is to provide a device of simple construction and which is capable of securely holding a tool by frictional contact between the tool-stock and a locking-block within the tool-holder or chuck.

By the use of this invention the tool may be inserted in a tool-holder without stopping or interrupting its movement, and if the rate of movement be not too great the tool may be removed therefrom and a new one inserted without interrupting the action of the chuck or tool-holder.

In the accompanying drawings, Figure 1 is an elevation of our improved tool-holder or chuck. Fig. 2 is a similar view with a part removed to show the locking-block in position. Fig. 3 is a sectional view on the line $a\,a$ of Fig. 1. Fig. 4 is a sectional view on the line $b\,b$ of Fig. 3. Fig. 5 is a perspective view of the stub end of a drill or other tool, illustrating clearly its peculiar form to adapt it to be used with the improved chuck. Fig. 6 is a perspective view of the locking-block.

Similar numerals of reference are employed to indicate corresponding parts in the several views.

The numeral 1 indicates a spindle which is to be connected to a machine for imparting rotary or reciprocatory movement to a drill or other tool 2 held in the improved tool-holder or chuck 3 on the end of the spindle 1. The tool-holder or chuck 3 comprises a body portion $3^a$, flattened on opposite sides and wider at the end connected to the spindle than at the tool end. A socket or hole 4, bored longitudinally in the head in the axial line of the spindle and extending nearly through said head, is connected to a rectangular opening 5, made through one side of the head, as shown in Figs. 2, 3, and 4. Movably fitting in said opening 5 is a locking-block 6, from the side of which lugs 7 project and form pivots for the locking-block, said pivotal lugs resting in seats 8, cut in the head at one side of the opening 5. (See Fig. 4.) The side of the locking-block 6 opposite the lugs 7 is curved, as shown at 9, substantially concentric to the axis of the bearing ends of the lugs 7 to permit the locking-block 6 to rock freely in a vertical direction in the opening 5. The locking-block 6 is held in depressed position by a spring 10, here shown as attached to a casing 11, screwed to the face of the head, which spring bears on the top of the locking-block 6. The lower side of the locking-block has a curved depression or face 12 eccentric to the bore 4 and ending in a projection 13 between the curved surfaces 9 and 12.

Tools—such as drills, reamers, &c.—used in connection with this holder and illustrated in Fig. 5 have their stub or fastening ends formed with a longitudinal cam-shaped surface 14, swaged or cut therefrom in such manner as to leave a shoulder 15 substantially equal to the length of the locking-block 6, so that when a tool is placed within the tool-holder as far as it will go and fastened the eccentric or cam face of the locking-block will bear against the surface 14 between the edges 16 of the depression and prevent the tool from falling out, especially when used in a vertical position.

From an inspection of Fig. 7 it will be seen that the projection 13 of the locking-block 6 extends into the bore 4 when a tool is not engaged therewith. If the stub end of the tool be passed into the bore 4, its rounded end 17 will strike the projection of the locking-block 6, which projection has a backward curve 18, (see Fig. 6,) and raise the locking-block high enough to permit the tool to enter the tool-holder to its full extent. This will bring the portion 14 of the stub end of the tool in line with the locking-block, as shown in Fig. 3. Now by rotating the tool in the direction indicated by the arrow, Fig. 4, the surface 14 of the tool will be brought into contact with the eccentric surface 12 of the locking-block and bind the tool between said locking-block 6 and the surface of the bore 4. The lower end of the locking-block 6 and the end of the tool being beyond the pivotal point of said block, the fastening is in the nature of a wedge-like connection. To disengage the tool from the holder, the tool is rotated in reverse direction to that shown by the arrow, Fig. 4, until the shoulder 15 strikes the projection 13 on the locking-block, which is thereby carried upwardly against the pressure of the spring 10 until the shoulder 15 passes beyond said point, when the tool may be withdrawn from the bore 4. The arrangement of the locking parts is such that the tool may be inserted in the holder irrespective of the relative position of the surfaces 14 to the eccentric face 12 of the locking-block, as the end 17 of the tool being rounded it will lift the locking-block above the bore 14 and hold it so raised until the tool is pushed home and turned sufficiently far to bring its cam-shaped surface 14 in contact with the curved eccentric face 12 of the locking-block 6.

The principle of the invention resides in the binding or clamping action of two cam or eccentric faces, one face formed on a rotatable element and the other face on a swinging element pivoted on an axis beyond that of the rotatable element.

Having thus described the invention, what is claimed as new is—

1. A chuck or tool-holder comprising a head having a longitudinal bore and an opening through one side connected to said bore and seats at one side of said opening, combined with a locking-block fitting said openings and having lugs resting in said seats, one face of said locking-block curved eccentrically to said bore.

2. A tool-holder or chuck having a pivoted element provided with a cam-face disposed perpendicularly to the longitudinal axis of the holder, the pivotal axis of the element being parallel with said longitudinal axis, and a rotatable tool having a cam-surface disposed perpendicularly to its longitudinal axis and adapted for interlocking engagement with the cam-face of the element.

3. A tool-holder or chuck having a longitudinal bore, a movable element seated therein and provided with a cam-face disposed perpendicularly to the longitudinal axis of the bore, and a tool having a cam-face arranged perpendicularly to its longitudinal axis and adapted for interlocking engagement with the first-named cam-face.

4. A tool-holder or chuck having a longitudinal bore, an eccentrically-pivoted member provided with a cam-face situated in the bore, the pivotal axis of the member being parallel with, and its cam-face perpendicular to, the longitudinal axis of the bore, and a tool having a cam-face arranged perpendicularly to its longitudinal axis and adapted for interlocking engagement with the cam-face of the member.

5. A tool-holder or chuck having a tool-seat, an eccentrically-pivoted block having a cam-face disposed in the seat, a tool having a cam-face adapted for interlocking engagement with that of the block, the pivotal axis of the block being parallel with, and the cam-faces of the block and tool perpendicular to, the longitudinal axis of the tool, and means for pressing the block yieldably to engaging position.

6. A tool-holder or chuck provided with a tool-seat, and a tool adapted to enter said seat, said chuck and tool being provided with cam-faces adapted for interlocking engagement and with interengaging projections.

7. A tool-holder or chuck having a tool-seat, a movable member projecting into the seat and provided with a cam-face, a tool having a cam-face adapted for interlocking engagement with the cam-face of the member, said member and tool being provided with projections adapted for engagement and for moving the member to releasing position by rotation of the tool, and means for pressing the member yieldably to engaging position.

In testimony whereof we affix our signatures in presence of two witnesses.

CHRIS. R. CHAPMAN.
WM. S. KENNELL.

Witnesses:
   THEO. A. WHEELER,
   THOS. S. JONES.